(12) United States Patent
Woo et al.

(10) Patent No.: US 10,563,754 B2
(45) Date of Patent: Feb. 18, 2020

(54) TRANSMISSION APPARATUS FOR A VEHICLE

(71) Applicants: HYUNDAI MOTOR COMPANY, Seoul (KR); KIA MOTORS CORPORATION, Seoul (KR)

(72) Inventors: Seunghyun Woo, Seoul (KR); Gi Beom Hong, Bucheon-si (KR); Daeyun An, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 134 days.

(21) Appl. No.: 15/823,978

(22) Filed: Nov. 28, 2017

(65) Prior Publication Data

US 2019/0113132 A1  Apr. 18, 2019

(30) Foreign Application Priority Data

Oct. 13, 2017  (KR) .......................... 10-2017-0133065

(51) Int. Cl.
| | | |
|---|---|---|
| *F16H 59/08* | (2006.01) | |
| *F16H 59/02* | (2006.01) | |
| *F16H 61/24* | (2006.01) | |

(52) U.S. Cl.
CPC ......... *F16H 59/08* (2013.01); *F16H 59/0278* (2013.01); *F16H 61/24* (2013.01); *F16H 2059/081* (2013.01)

(58) Field of Classification Search
CPC .. F16H 59/08; F16H 59/0217; F16H 59/0278; F16H 2059/081; F16H 2059/026; F16H 63/40; F16H 2063/423; F16H 61/24; G05G 1/08; G05G 1/10; B60W 50/16
USPC ........................................................ 74/473.3
See application file for complete search history.

(56) References Cited

U.S. PATENT DOCUMENTS

| | | | | |
|---|---|---|---|---|
| 8,960,361 | B2 * | 2/2015 | Helot ..................... | B60K 20/02 180/326 |
| 9,079,545 | B2 | 7/2015 | Dugan | |
| 9,494,228 | B2 * | 11/2016 | Hermansson ....... | F16H 59/0204 |
| 2007/0261509 | A1 * | 11/2007 | Meyer ................... | B60K 37/06 74/504 |

(Continued)

FOREIGN PATENT DOCUMENTS

| | | |
|---|---|---|
| JP | 2009012624 | 1/2009 |
| JP | 2017003079 | 1/2017 |

(Continued)

*Primary Examiner* — Jake Cook
*Assistant Examiner* — T. Scott Fix
(74) *Attorney, Agent, or Firm* — Lempia Summerfield Katz LLC (57) ABSTRACT

A transmission apparatus for a vehicle includes a shift lever in which a cover is movably disposed. The transmission apparatus, which performs a gear shift according to a gear shift command received by the shift lever, includes a bottom portion capable of moving linearly so that gear shift stages including a first gear shift stage and a plurality of second gear shift stages are mutually shifted, a body rotatably coupled to an upper side of the bottom portion so that the plurality of second gear shift stages are mutually shifted, and a cover movably disposed on an upper end of the body so that a position of the cover is varied according to the mutual shift of the gear shift stages.

18 Claims, 8 Drawing Sheets

(56) References Cited

U.S. PATENT DOCUMENTS

| | | | |
|---|---|---|---|
| 2009/0193921 A1 | 8/2009 | Ishizu et al. | |
| 2012/0143409 A1* | 6/2012 | Curtis | B60W 50/082 |
| | | | 701/22 |
| 2013/0139632 A1* | 6/2013 | Rake | F16H 59/08 |
| | | | 74/473.3 |
| 2016/0178050 A1* | 6/2016 | Park | F16H 59/0204 |
| | | | 74/473.18 |
| 2016/0378131 A1* | 12/2016 | Battlogg | G05G 5/03 |
| | | | 74/553 |
| 2017/0191562 A1 | 7/2017 | Kim et al. | |
| 2017/0227118 A1* | 8/2017 | Buttolo | F16H 59/0217 |
| 2017/0343102 A1* | 11/2017 | Barke | B60K 20/06 |
| 2017/0356543 A1* | 12/2017 | Turney | F16H 59/0204 |

FOREIGN PATENT DOCUMENTS

| | | |
|---|---|---|
| KR | 101439160 | 9/2014 |
| KR | 200479639 | 2/2016 |
| KR | 101664753 | 10/2016 |
| KR | 101704290 | 2/2017 |

\* cited by examiner

TRANSMISSION APPARATUS FOR A VEHICLE

CROSS-REFERENCE TO RELATED APPLICATION

This application claims the benefit of Korean Patent Application No. 10-2017-0133065, filed on Oct. 13, 2017 in the Korean Intellectual Property Office, the disclosure of which is incorporated herein by reference in its entirety.

BACKGROUND

1. Field

An embodiment of the present disclosure relates to a transmission apparatus for a vehicle, including a shift lever in which a cover is movably disposed.

2. Description of the Related Art

A vehicle is a machine configured to drive wheels to move on a road.

Generally, a transmission apparatus is an apparatus configured to transmit power generated by an engine to driving wheels by changing a rotational force and a speed to be suitable for a running state of the vehicle. A transmission apparatus may be classified as a manual transmission apparatus or an automatic transmission apparatus.

A driver operating the vehicle can change a gear shift stage of the manual transmission apparatus or the automatic transmission apparatus to a desired gear shift stage by operating a shift lever mounted on a console surface or a steering wheel around a driver's seat.

In particular, the automatic transmission apparatus may be operated in such a manner that, when the driver moves the shift lever, an inhibitor switch is operated via a cable to transmit movement desired by the driver to the transmission apparatus.

Recently, a shift-by-wire (SBW) type shift lever is used in the vehicle. Unlike a mechanical shift lever, the SBW type shift lever can receive a gear shift command through various operating methods.

Unlike a mechanical shift lever, the SBW type shift lever has no mechanical cable connection structure and has an advantage in a lever operation force or a lever operation feeling.

The SBW type shift lever may include a lever type shift lever in which a shift lever protruding from the console surface of the vehicle is operated forward and backward, and a dial type shift lever in which a cylindrical shift lever mounted on the console surface of the vehicle is operated by being turned left and right.

Further, the SBW type shift lever may include a column-type shift lever in which a shift lever mounted on a side surface of the steering wheel of the vehicle is vertically operated, a button-type shift lever operated by pressing a button on which a gear shift stage of the vehicle is marked, and so on.

SUMMARY

Therefore, it is an aspect of the present disclosure to provide an improved transmission apparatus for a vehicle, including a first gear shift stage capable of shifting gears in accordance with linear movement of a shift lever and a plurality of second gear shift stages capable of shifting gears in accordance with rotation of the shift lever.

Also, it is another aspect of the present disclosure to provide an improved transmission apparatus for a vehicle, in which a position of a cover is moved corresponding to a gear shift stage when the shift lever receives a gear shift command.

Additional aspects of the disclosure will be set forth in the description which follows.

In accordance with one aspect of the present disclosure, a transmission apparatus for a vehicle, which performs a gear shift according to a gear shift command received by a shift lever, includes a bottom portion capable of moving linearly so that gear shift stages including a first gear shift stage and a plurality of second gear shift stages are mutually shifted, a body rotatably coupled to an upper side of the bottom portion so that the plurality of second gear shift stages are mutually shifted, and a cover movably disposed on an upper end of the body so that a position of the cover is varied according to the mutual shift of the gear shift stages.

The body may include a first body configured to face the gear shift stage to input the gear shift command to the shift lever and a second body configured to face in a direction opposite to the first body, and the cover may be disposed on the first body or the second body.

The body may include a rail provided so that the cover is movably coupled to the body.

The cover may include an elastic material.

The transmission apparatus for a vehicle may further include a potentiometer configured to measure a rotation angle of the body so that the shift lever receives the gear shift command according to rotation of the body.

The transmission apparatus for a vehicle may further include a rotary encoder integrated motor having a rotary encoder configured to receive the gear shift command according to the rotation angle of the body measured by the potentiometer and a motor configured to move the cover in response to the gear shift command received by the rotary encoder.

The shift lever may be configured to move forward and backward between the first gear shift stage and the plurality of second gear shift stages disposed in front of the first gear shift stage.

The plurality of second gear shift stages may be configured to be mutually shifted by rotating by 90 degrees.

The transmission apparatus for a vehicle may further include an accommodation portion having an accommodation space in which the bottom portion is accommodated to linearly move forward and backward.

The transmission apparatus for a vehicle may further include a tact switch provided to protrude from an inside of the accommodation portion into the accommodation space toward the shift lever to receive the gear shift command by interfering with the bottom portion.

The first gear shift stage may include a P-gear shift stage, and the plurality of second gear shift stages may include a D-gear shift stage, a N-gear shift stage, and a R-gear shift stage.

When the shift lever receives the gear shift command corresponding to the D-gear shift stage or the R-gear shift stage, the cover may be disposed on the body so that a size of the cover disposed on the first body is larger than that of the cover disposed on the second body.

When the shift lever receives the gear shift command corresponding to the N-gear shift stage, the cover may be disposed on the body so that a size of the cover disposed on the first body and that of the cover disposed on the second body are the same as each other.

The D-gear shift stage and the R-gear shift stage may be spaced apart from each other by 180 degrees, and the N-gear shift stage may be spaced apart from the D-gear shift stage or the R-gear shift stage by 90 degrees.

When the shift lever receives the gear shift command corresponding to the P-gear shift stage, the cover may be disposed only on the first body.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

While the present disclosure describes various embodiments within the specification and configurations illustrated in the drawings, it should be understood that various modified examples which can replace them are present at the time when the present disclosure is filed.

Further, the same reference numerals or symbols given in the various figures of the present specification indicate elements or components performing substantially the same function. Also, the terms used herein are used to illustrate the embodiments and are not intended to limit and/or to restrict the described disclosure.

Unless the context clearly indicates otherwise, singular expressions should be interpreted to include plural expressions. The terms "comprises," "comprising," "includes" or "has" are intended to indicate the presence of features, numerals, steps, operations, elements and components described in the specification or the presence of combinations of these.

Therefore, the terms do not preclude the presence or addition of one or more other features, numerals, steps, operations, elements and components, or combinations of these.

The terms including ordinal numbers such as "first," "second," etc. can be used to describe various components, but the components are not limited by those terms. The terms are used merely for the purpose of distinguishing one component from another.

For example, a first component may be called a second component, and similarly, a second component may be called a first component without departing from the scope of rights of the present disclosure. The term "and/or" encompasses combinations of a plurality of related items or any one of the plurality of related items.

Meanwhile, the terms such as "front", "rear", "upper", and "lower" used in the following descriptions are defined on the basis of drawings, and a shape and a position of each element should not be limited by the terminology.

Hereinafter, embodiments of the present disclosure will be described in detail with reference to the accompanying drawings.

Figure 1:
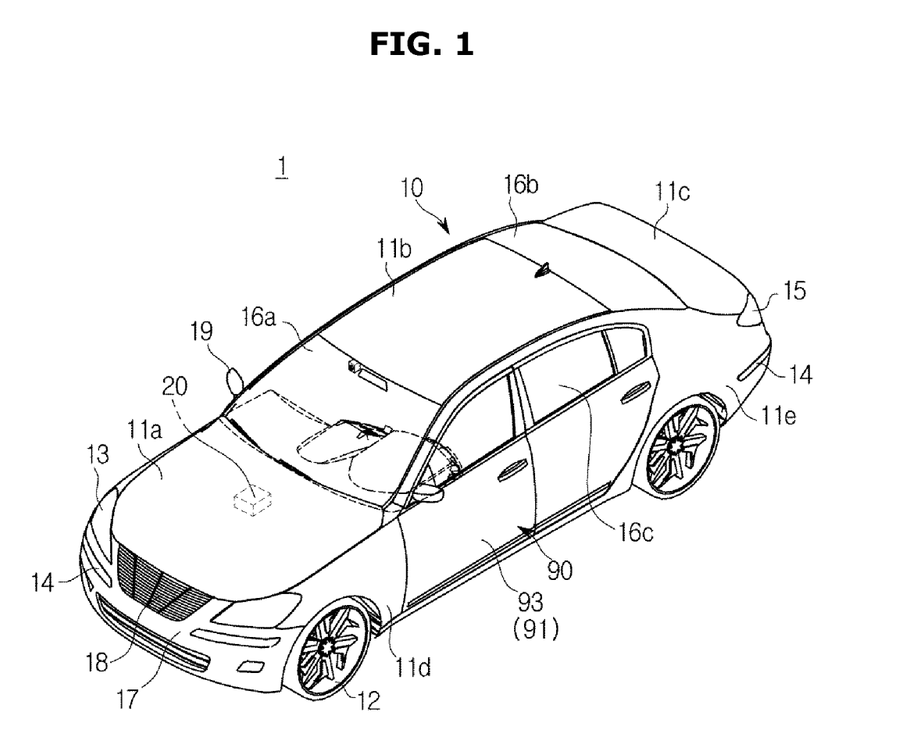
FIG. 1 is a view illustrating an exterior of a vehicle including a transmission apparatus for a vehicle according to an embodiment of the present disclosure.

FIG. 1 is a view illustrating an exterior of a vehicle including a transmission apparatus for a vehicle according to an embodiment of the present disclosure. As illustrated in FIG. 1, a vehicle 1 may include a vehicle body 10 configured to form an exterior and a wheel 12 configured to move the vehicle 1.

The vehicle 1 may refer to various devices configured to move an object to be transported, such as a person, a thing, or an animal, from a departure point to a destination. The vehicle 1 may include an automobile configured to travel on a road or a track, a ship configured to move over the sea or a river, and an airplane configured to fly the sky using use an action of the air.

The vehicle 1 traveling on the road or the track may move in a predetermined direction in accordance with rotation of at least one wheel 12 and may include, for example, a three- or four-wheeled vehicle, a construction machine, a two-wheeled vehicle, a prime mover, a bicycle, and a train traveling on the track.

The vehicle body 10 may include a hood 11a configured to protect various devices necessary for driving the vehicle 1 such as an engine, a roof panel 11b configured to form an indoor space, a trunk lid 11c in which an accommodation space is provided, and a front fender 11d and a quarter panel 11e provided on a side surface of the vehicle 1.

Further, a plurality of doors 90 hinge-coupled to the vehicle body 10 may be provided on a side surface of the vehicle body 10. The door 90 may include a door panel 91 which is a plate formed of metal or plastic constituting the door 90. The door panel 91 may include a door outer panel 93 configured to form the exterior of the vehicle 1.

A side window 16c configured to provide a side view may be provided at an upper side of the door 90. A front window 16a configured to provide a front view of the vehicle 1 may be provided between the hood 11a and the roof panel 11b, and a rear window 16b configured to provide a rear view of the vehicle 1 may be provided between the roof panel 11b and the trunk lid 11c.

The door 90 may include a side mirror 19 configured to monitor a rear side.

A head lamp 13 configured to radiate light in a traveling direction of the vehicle 1 may be provided at a front of the vehicle 1. A turn signal lamp 14 configured to indicate the traveling direction of the vehicle 1 may be provided at the front or rear of the vehicle 1.

A tail lamp 15 capable of displaying a gear shift state, a brake operation state or the like of the vehicle 1 may be provided at the rear of the vehicle 1.

The vehicle body 10 may include a front bumper 17, a radiator grille 18 and so on.

At least one vehicle controller 20 capable of performing electronic control related to an operation of the vehicle 1 may be provided inside the vehicle 1.

Figure 2:
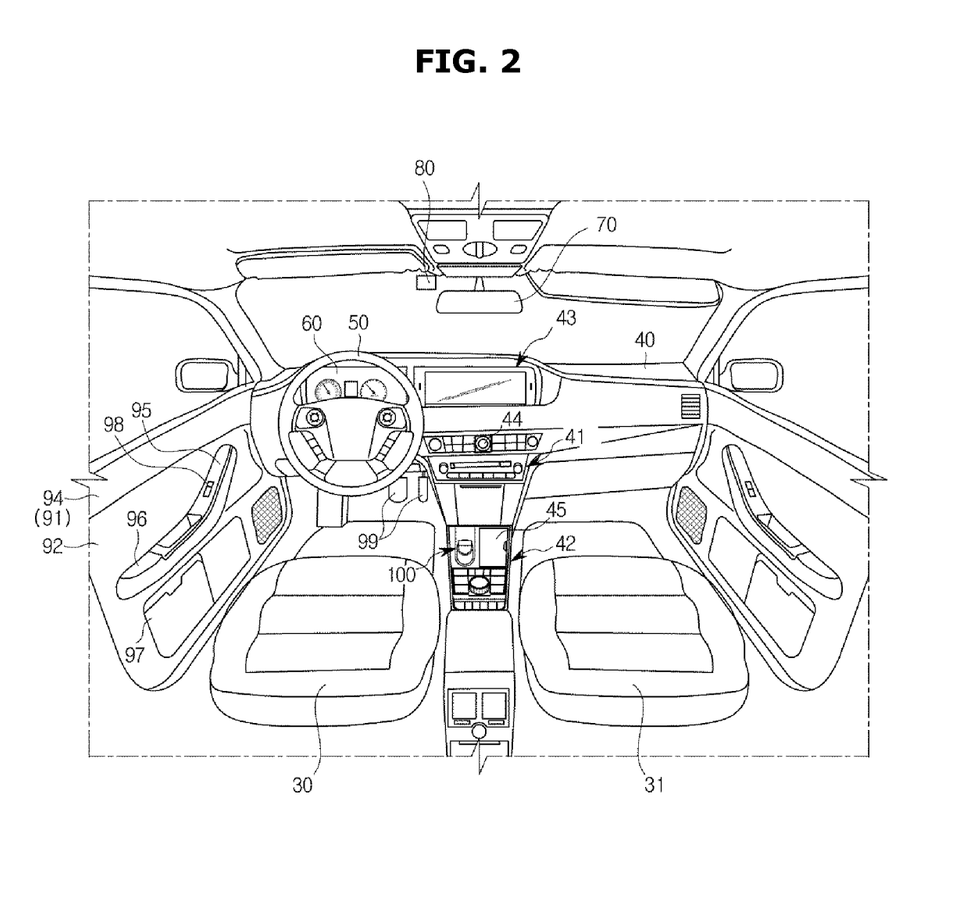
FIG. 2 is a view illustrating an interior structure of the vehicle including the transmission apparatus for a vehicle according to an embodiment of the present disclosure.

FIG. 2 is a view illustrating an indoor structure of the vehicle including the transmission apparatus for a vehicle according to an embodiment of the present disclosure. As illustrated in FIG. 2, a drivers seat 30 and a passenger seat 31 may be provided in an interior of the vehicle 1. A dashboard 40, a steering wheel 50, and an instrument panel 60 may be provided in the interior of the vehicle 1.

The dashboard 40 may refer to an indoor panel by which the interior of the vehicle 1 and an engine room (not illustrated) are partitioned and in which various components necessary for driving are installed. The dashboard 40 may include an upper panel, a center fascia 41, a gear box 42, and so on.

A vehicle display device 43 capable of providing a variety of information to a driver or a passenger of the vehicle 1 in the form of an image may be installed on the upper panel of the dashboard 40. The center fascia 41 may be installed at a center of the dashboard 40 and may have an input device 44 configured to input various commands related to the vehicle 1.

The gear box 42 may be located at a lower end of the center fascia 41 and may be provided between the driver's seat 30 and the passenger seat 31. An accommodation compartment 45 and a transmission apparatus 100 for a vehicle may be provided in the gear box 42. A detailed description of the transmission apparatus 100 for a vehicle will be provided below.

The steering wheel 50 is provided to be rotatable in a predetermined direction in accordance with a driver's operation, and the vehicle 1 may be steered by turning the wheels 12 of the vehicle 1 in a rotational direction of the steering wheel 50.

The instrument panel 60 may be provided to provide the driver with a variety of information related to the vehicle 1, such as a speed of the vehicle 1, an engine RPM, a remaining amount of fuel, temperature of engine oil, flashing of the turn signal lamp 14, a moving distance of the vehicle 1, and so on.

A rear-view mirror 70 may be provided at an upper end of the interior of the vehicle 1, and the driver may view the rear side of the vehicle 1 or the interior of the vehicle 1 through the rear-view mirror 70.

At least one camera 80 capable of photographing a surrounding image of the vehicle 1 while the vehicle 1 is traveling or stopped and acquiring position information of a preceding vehicle located in front of the vehicle 1 may be provided inside the vehicle 1.

The door 90 may include the door panel 91 configured to form the exterior of the vehicle 1 and a door trim 92 mounted on an inner side of the door panel 91. The door panel 91 may include a door inner panel 94 configured to face the interior of the vehicle 1 to face the door outer panel 93.

The door trim 92 may have functions of sound insulation, sound absorption and protection of the passenger in the event of a collision, as well as interior decoration.

An inside handle (not illustrated) capable of opening the door 90 and a pull handle 95 capable of pulling and closing the door 90 may be provided on an inner surface of the door trim 92. An armrest 96 and a door pocket 97 may be provided on the door trim 92.

A door lock device (not illustrated) configured to lock and unlock the side window 16c and the door 90 may be provided in the door 90. Various switches 98 such as a window opening/closing switch, a door locking/unlocking switch, a side mirror adjusting switch, and so on may be provided on the door trim 92.

The vehicle 1 may include various vehicle pedals 99 such as an accelerator pedal configured to accelerate the vehicle 1, a brake pedal configured to stop the vehicle 1, a clutch pedal configured to shift gears, and so on.

Figure 3:
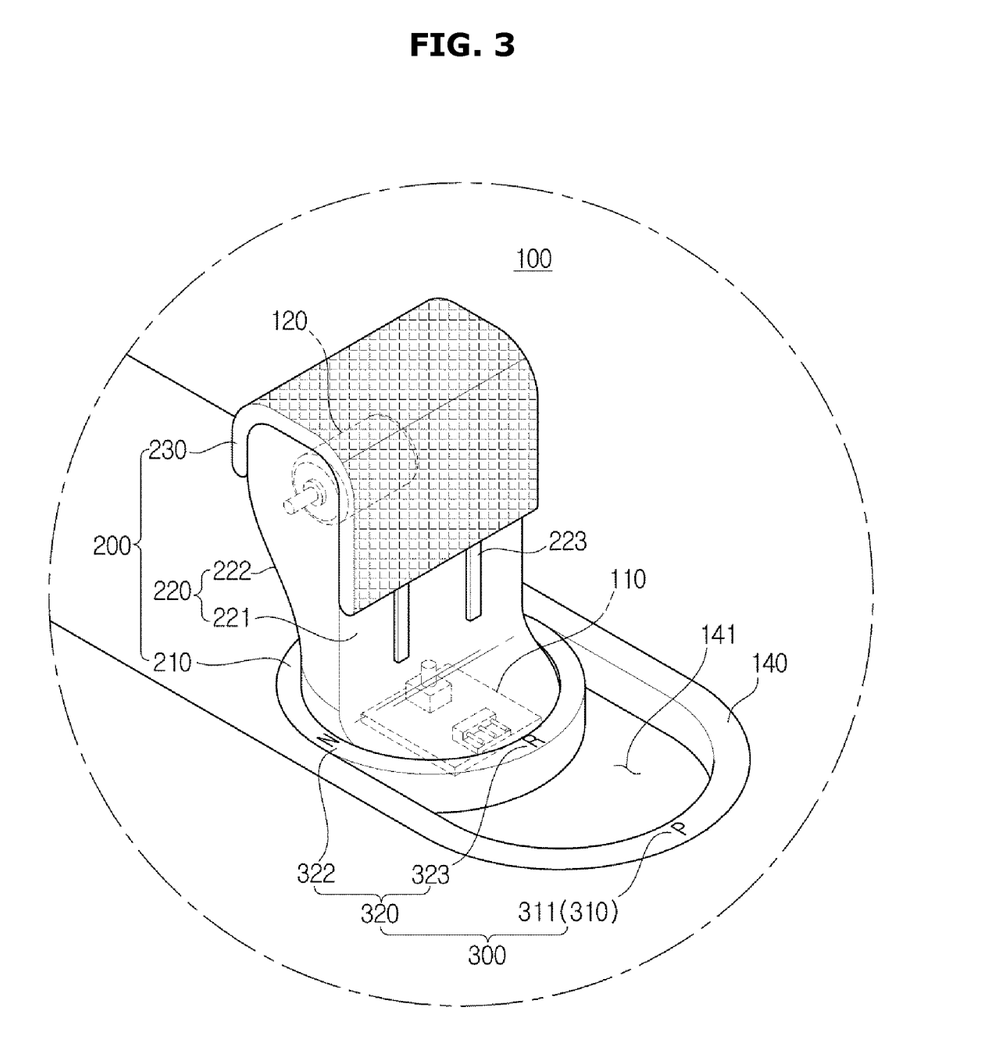
FIG. 3 is a view illustrating a shift lever in the transmission apparatus for a vehicle according to an embodiment of the present disclosure.

FIG. 3 is a view illustrating a shift lever in the transmission apparatus for a vehicle according to an embodiment of the present disclosure. As illustrated in FIG. 3, the transmission apparatus 100 for a vehicle according to the present disclosure may perform gear-shifting of the vehicle 1 in accordance with a gear shift command input to a shift lever 200.

The transmission apparatus 100 for a vehicle may include a gear shift stage 300. The gear shift stage 300 may include a first gear shift stage 310 and a second gear shift stage 320. A plurality of second gear shift stages 320 may be provided. However, the present disclosure is not limited thereto.

The second gear shift stage 320 may be disposed in front of the first gear shift stage 310.

The shift lever 200 may include a bottom portion 210 capable of moving linearly so that the gear shift stage 300 including the first gear shift stage 310 and the plurality of second gear shift stages 320 are shifted mutually.

The bottom portion 210 may be formed in a circular or elliptical shape. However, the present disclosure is not limited thereto. The bottom portion 210 may include the plurality of second gear shift stages 320.

The shift lever 200 may include a body 220 coupled to an upper side of the bottom portion 210. The body 220 may be rotatably coupled to the bottom portion 210 so that the plurality of second gear shift stages 320 are mutually shifted.

The driver may input a gear shift command to the shift lever 200 by grasping the body 220 and linearly moving or rotating the body 220 while the vehicle 1 is traveling.

The body 220 may include a first body 221 configured to face the gear shift stage 300 to input the gear shift command to the shift lever 200, and a second body 222 configured to face in a direction opposite to the first body 221.

For convenience of the driver grasping the body 220, the first body 221 may be formed in a flat surface shape, and the second body 222 may be formed in a curved surface shape. However, the present disclosure is not limited thereto.

The shift lever 200 may include a cover 230 disposed at an upper end of the body 220. A position of the cover 230 may be changed according to the mutual shifting of the gear shift stage 300. The cover 230 may be movably disposed on the upper end of the body 220.

The cover 230 may be disposed on the first body 221 or the second body 222. That is, the cover 230 may be disposed simultaneously on the first body 221 and the second body 222 or may be disposed on only the first body 221. However, the present disclosure is not limited thereto.

The cover 230 may include a contractible elastic material.

The body 220 may include a rail 223 configured to allow the cover 230 to be movable on the body 220. The rails 223 may be provided on the first body 221 and the second body 222. A moving distance of the cover 230 moving along the body 220 may be limited by a length of the rail 223.

The first gear shift stage 310 may include a P-gear shift stage 311, and the P-gear shift stage 311 (Parking) may correspond to the gear shift stage 300 when the vehicle 1 is not moving, like when the vehicle 1 is parked or started.

The plurality of second gear shift stages 320 may include a D-gear shift stage 321 (refer to FIG. 5), an N-gear shift stage 322, and an R-gear shift stage 323. The D-gear shift stage 321 (Drive) may correspond to the gear shift stage 300 when the vehicle 1 is traveling, the N-gear shift stage 322 may correspond to the gear shift stage 300 when the vehicle 1 is in a neutral state, and the R-gear shift stage 323 (Reverse) may correspond to the gear shift stage 300 when the vehicle 1 is reversed.

The D-gear shift stage 321 and the R-gear shift stage 323 may be arranged to be spaced apart from each other by 180 degrees, and the N-gear shift stage 322 may be arranged to be spaced apart from the D-gear shift stage 321 or R-gear shift stage 323 by 90 degrees. However, the present disclosure is not limited thereto.

The transmission apparatus 100 for a vehicle may include a potentiometer 110 configured to measure a rotation angle of the body 220 so that the shift lever 200 receives the gear shift command corresponding to the plurality of second gear shift stages 320 according to rotation of the body 220.

The potentiometer 110 may adjust an amount or magnitude of an electrical output signal through a mechanical position change. The potentiometer 110 may be disposed inside the bottom portion 210. However, the present disclosure is not limited thereto.

The transmission apparatus 100 for a vehicle may include a rotary encoder integrated motor 120 configured to receive the gear shift command corresponding to one of the plurality of second gear shift stages 320 according to the rotation angle of the body 220 measured from the potentiometer 110.

The rotary encoder integrated motor 120 may be formed to move the cover 230 in response to the received gear shift command. However, the present disclosure is not limited thereto, and the rotary encoder integrated motor 120 may include a rotary encoder and a motor, respectively, instead of being formed to be integrated into one component.

The rotary encoder integrated motor 120 may be disposed inside the body 220 and may be connected to the cover 230. However, the present disclosure is not limited thereto.

The transmission apparatus 100 for a vehicle may include an accommodation portion 140 having an accommodation space 141 configured to accommodate the shift lever 200. The shift lever 200 may be accommodated in the accommodation space 141 and may linearly move forward or backward.

The bottom portion 210 may be accommodated in the accommodation space 141. The accommodation space 141 may be larger than the bottom portion 210. The accommodation portion 140 may be formed in an elliptical shape. However, the present disclosure is not limited thereto.

The accommodation portion 140 may include the first gear shift stage 310. The first gear shift stage 310 may be disposed at one end of the accommodation portion 140. The first gear shift stage 310 may be disposed behind the shift lever 200.

Figure 4:
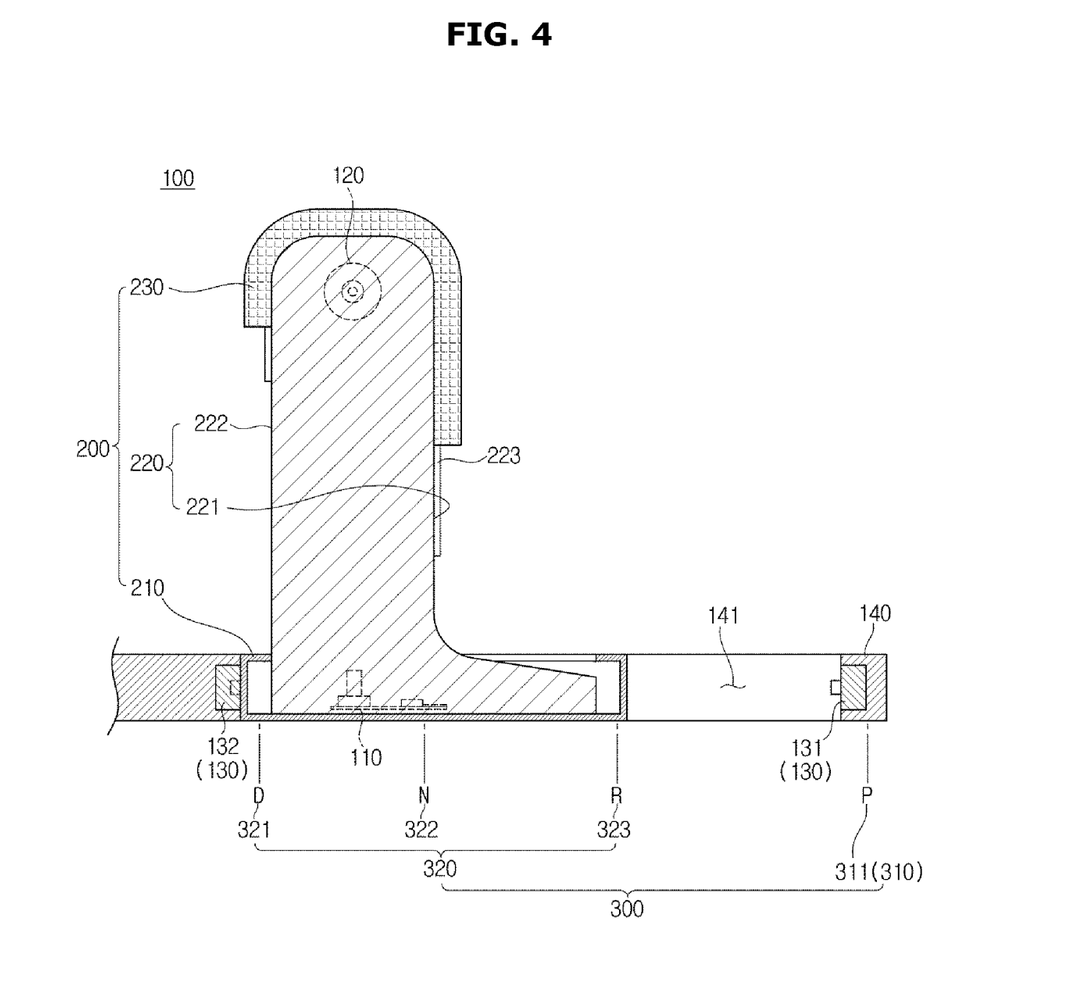
FIG. 4 is a view illustrating a tact switch provided in an accommodation portion in the transmission apparatus for a vehicle according to an embodiment of the present disclosure.

FIG. 4 is a view illustrating a tact switch provided in the accommodation portion in the transmission apparatus for a vehicle according to an embodiment of the present disclosure. As illustrated in FIG. 4, the shift lever 200 may be accommodated in the accommodation space 141 and may move forward and backward between the first gear shift stage 310 and the plurality of second gear shift stages 320.

The transmission apparatus 100 for a vehicle may include a tact switch 130 provided in the accommodation portion 140. The tact switch 130 interferes with the bottom portion 210 so that the shift lever 200 can receive the gear shift command between the first gear shift stage 310 and the second gear shift stage 320.

The tact switch 130 may be formed to protrude from an inside of the accommodation portion 140 into the accommodation space 141 toward the shift lever 200.

A plurality of tact switches 130 may be provided. The tact switch 130 may include a first tact switch 131 provided inside the accommodation portion 140 in which the first gear shift stage 310 is disposed, and a second tact switch 132 provided inside the accommodation portion 140 disposed in front of the D-gear shift stage 321.

The first tact switch 131 may be provided inside the accommodation portion 140 in order to protrude toward the R-gear shift stage 323, and the second tact switch 132 may be provided inside the accommodation portion 140 in order to protrude toward the D-gear shift stage 321.

The shift lever 200 may move backward in the accommodation space 141 and may receive the gear shift command corresponding to the first gear shift stage 310 by pressing the first tact switch 131.

The shift lever 200 may move forward in the accommodation space 141 and may receive the gear shift command corresponding to the second gear shift stage 320 by pressing the second tact switch 132.

The shift lever 200 may receive the gear shift command corresponding to the gear shift stage among the plurality of second gear shift stages 310 by pressing the second tact switch 132.

That is, the driver may input the gear shift command corresponding to the gear shift stage among the plurality of second gear shift stages 320 by rotating the body 220 while the bottom portion 210 presses the second tact switch 132.

While the bottom portion 210 presses the first tact switch 131, even when the driver rotates the body 220, the gear shift command corresponding to the gear shift stage among the plurality of second gear shift stages 320 is not input, but only the gear shift command corresponding to the first gear shift stage 310 may be input.

Therefore, the driver can intuitively sense the gear shift between the first gear shift stage 310 and the second gear shift stage 320 through the forward and backward movement of the shift lever 200.

Figure 5:
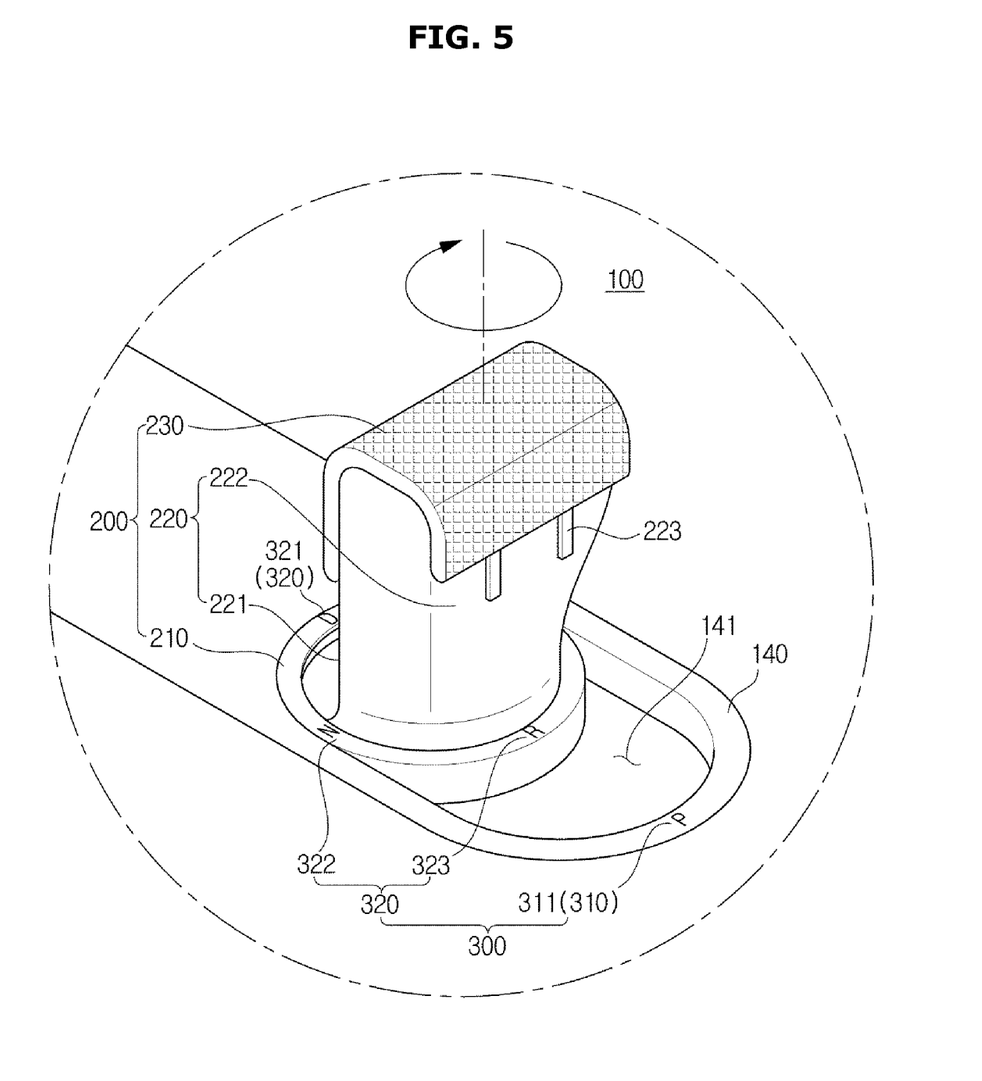
FIG. 5 is a view illustrating a state in which a gear shift command corresponding to a D-gear shift stage is input to a shift lever in the transmission apparatus for a vehicle according to an embodiment of the present disclosure.
Figure 6:
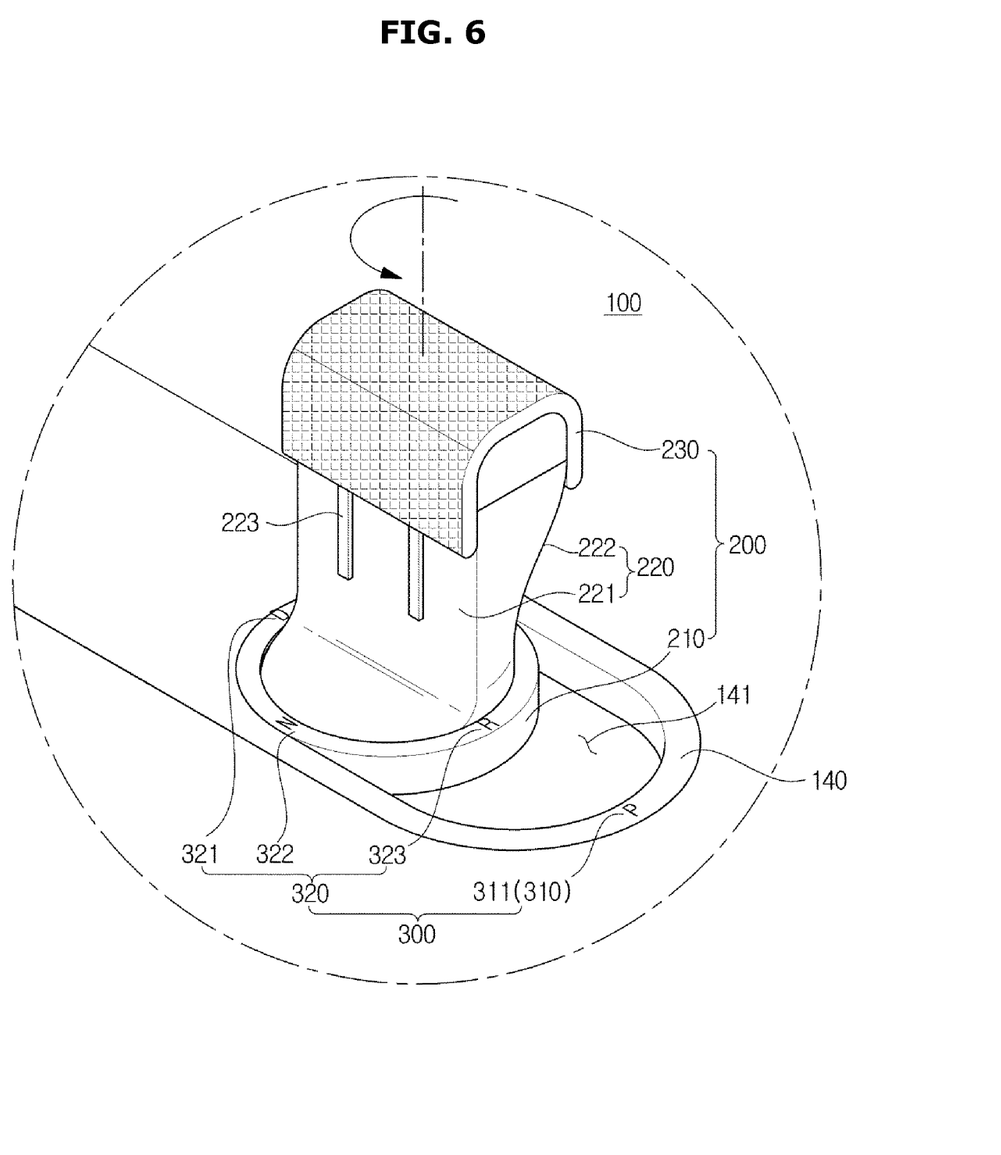
FIG. 6 is a view illustrating a state in which a gear shift command corresponding to an N-gear shift stage is input to the shift lever in the transmission apparatus for a vehicle according to an embodiment of the present disclosure.
Figure 7:
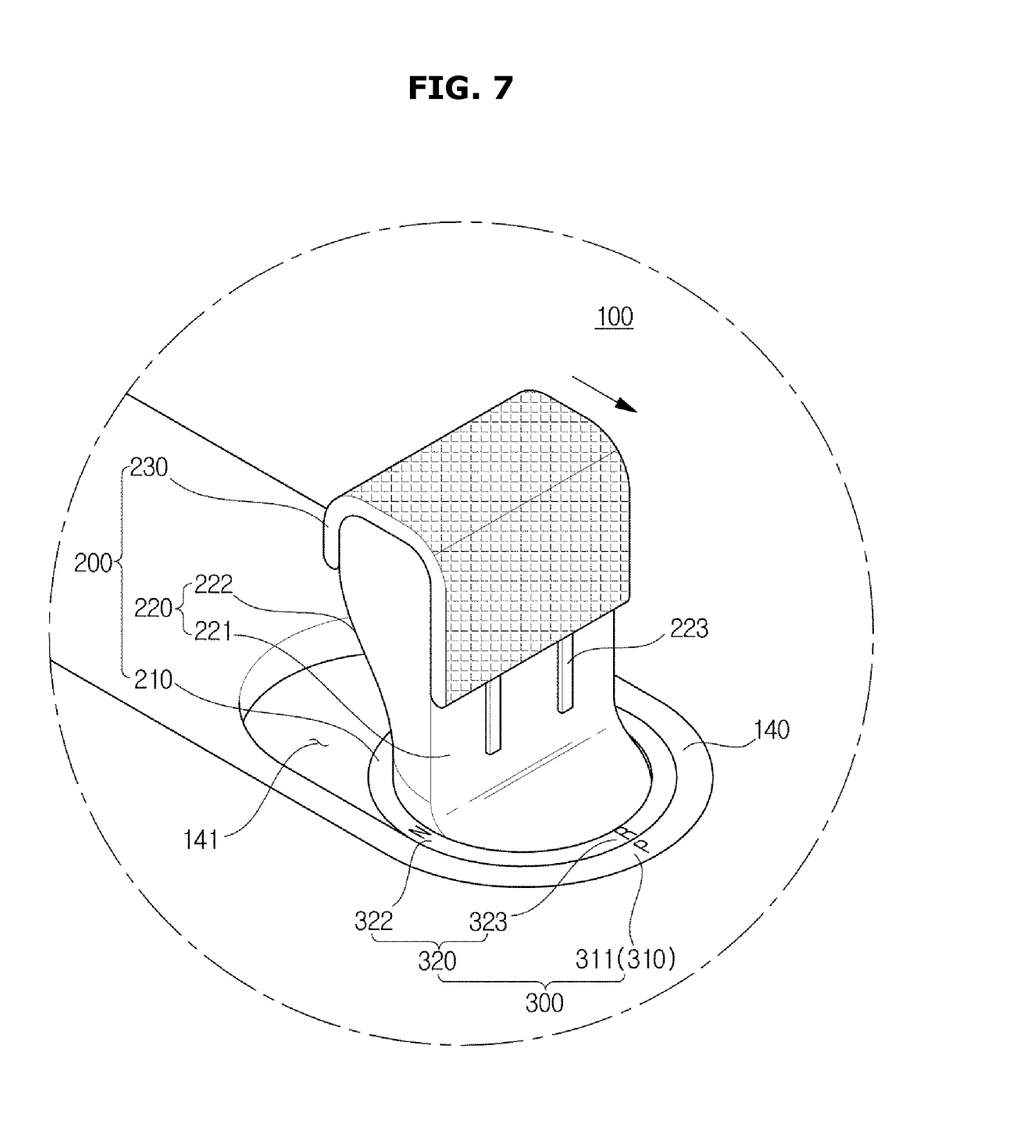
FIG. 7 is a view illustrating a state in which a gear shift command corresponding to a P-gear shift stage is input to the shift lever in the transmission apparatus for a vehicle according to an embodiment of the present disclosure.

FIG. 5 is a view illustrating a state in which the gear shift command corresponding to the D-gear shift stage is input to the shift lever in the transmission apparatus for a vehicle according to an embodiment of the present disclosure. FIG. 6 is a view illustrating a state in which the gear shift command corresponding to the N-gear shift stage is input to the shift lever in the transmission apparatus for a vehicle according to an embodiment of the present disclosure. FIG. 7 is a view illustrating a state in which a gear shift command corresponding to the P-gear shift stage is input to the shift lever in the transmission apparatus for a vehicle according to an embodiment of the present disclosure.

As illustrated in FIGS. 3 and 5 to 7, the plurality of second gear shift stages 320 may be formed to rotate by 90 degrees and to be shifted from each other.

The shift lever 200 may move forward in the accommodation space 141 so that the bottom portion 210 presses the second tact switch 132 (refer to FIG. 4), and thus the shift lever 200 may receive the gear shift command corresponding to the plurality of second gear shift stages 320.

Referring to FIG. 5, when the shift lever 200 receives the gear shift command corresponding to the D-gear shift stage 321, the first body 221 may be directed to the D-gear shift stage 321, and the second body 222 may be directed to the R-gear shift stage 323.

When the shift lever 200 receives the gear shift command corresponding to the D-gear shift stage 321, the cover 230 may move along the rail 223 such that a size of the cover 230 disposed on the first body 221 is larger than that of the cover 230 disposed on the second body 222.

The driver grasping the shift lever 200 can recognize a fact that the size of the cover 230 disposed on the first body 221 in contact with the driver's fingers is larger than that of the cover 230 disposed on the second body 222 in contact with the driver's palm with only a tactile sense.

Therefore, the driver can intuitively recognize a fact that the gear shift command of the D-gear shift stage 321 is input to the shift lever 200.

Referring to FIG. 6, when the shift lever 200 receives the gear shift command corresponding to the N-gear shift stage 322, the first body 221 and the second body 222 may be directed to the N-gear shift stage 322, respectively.

While the shift lever 200 inputs the gear shift command corresponding to the D-gear shift stage 321, the driver may input the gear shift command corresponding to the N-gear shift stage 322 to the shift lever 200 by rotating the body 220 in a clockwise or counterclockwise direction by 90 degrees.

When the shift lever 200 is rotated clockwise from the D-gear shift stage 321 by 90 degrees, the first body 221 may be directed to the N-gear shift stage 322 disposed on a right side, and the second body 222 may be directed to the N-gear shift stage 322 disposed on a left side.

When the shift lever 200 is rotated counterclockwise from the D-gear shift stage 321 by 90 degrees, the first body 221 may be directed to the N-gear shift stage 322 disposed on the left side, and the second body 222 may be directed to the N-gear shift stage 322 disposed on the right side.

When the shift lever 200 receives the gear shift command corresponding to the N-gear shift stage 322, the cover 230 may move along the rail 223 so that the size of the cover 230 disposed on the first body 221 is the same as that of the cover 230 disposed on the second body 222.

The driver grasping the shift lever 200 can recognize a fact that the size of the cover 230 disposed on each of the first body 221 and the second body 222 in contact with the both sides of the palm is the same with only the tactile sense.

Therefore, the driver can intuitively recognize a fact that the gear shift command of the N-gear shift stage 322 is input to the shift lever 200.

However, the present disclosure is not limited thereto. That is, when the shift lever 200 receives the gear shift command corresponding to the N-gear shift stage 322, the driver can recognize the cover 230 in contact with a side surface of the palm with only the tactile sense, regardless of the size of the cover 230 disposed on each of the first body 221 and the second body 222.

Accordingly, the driver can recognize intuitively a fact that the gear shift command of the N-gear shift stage 322 is input to the shift lever 200, regardless of the movement of the cover 230.

Referring to FIG. 3, when the shift lever 200 receives the gear shift command corresponding to the R-gear shift stage 323, the first body 221 may be directed to the R-gear shift stage 323, and the second body 222 may be directed to the D-gear shift stage 321.

While the shift lever 200 inputs the gear shift command corresponding to the N-gear shift stage 322, the driver may input the gear shift command corresponding to the R-gear shift stage 323 to the shift lever 200 by rotating the body 220 in the clockwise or counterclockwise direction by 90 degrees.

The driver can input the gear shift command corresponding to the R-gear shift stage 323 to the shift lever 200 by rotating clockwise the shift lever 200 from the N-gear shift stage 322 on the right side by 90 degrees or rotating counterclockwise the shift lever 200 from the N-gear shift stage 322 on the left side by 90 degrees.

While the shift lever 200 inputs the gear shift command corresponding to the D-gear shift stage 321, the driver may input the gear shift command corresponding to the R-gear shift stage 323 to the shift lever 200 by rotating the body 220 in the clockwise or counterclockwise direction by 180 degrees.

When the shift lever 200 receives the gear shift command corresponding to the R-gear shift stage 323, the cover 230 may move along the rail 223 so that the size of the cover 230 disposed on the first body 221 is larger than that of the cover 230 disposed on the second body 222.

The driver grasping the shift lever 200 can recognize a fact that the size of the cover 230 disposed on the first body 221 in contact with the palm is larger than that of the cover 230 disposed on the second body 222 in contact with the fingers with only the tactile sense.

Therefore, the driver can intuitively recognize a fact that the gear shift command of the R-gear shift stage 323 is input to the shift lever 200.

Referring to FIG. 7, the shift lever 200 may move backward in the accommodation space 141 so that the bottom portion 210 presses the first tact switch 131 (refer to FIG. 4), and thus the shift lever 200 may receive the gear shift command corresponding to the first gear shift stage 310.

When the shift lever 200 receives the gear shift command corresponding to the P-gear shift stage 311, the first body 221 may be directed to the R-gear shift stage 323 and the P-gear shift stage 311, and the second body 222 may be directed to the D-gear shift stage 321 (refer to FIG. 5).

While the shift lever 200 inputs the gear shift command corresponding to the second gear shift stage 320, the driver may input the gear shift command corresponding to the P-gear shift stage 311 to the shift lever 200 by linearly moving the shift lever 200 backward along the accommodation space 141.

That is, while the shift lever 200 inputs the gear shift command corresponding to the plurality of second gear shift stages 320, the driver may input the gear shift command corresponding to the P-gear shift stage 311 to the shift lever 200 by linearly moving the shift lever 200 backward along the accommodation space 141, regardless of the gear shift command corresponding to each of the N-gear shift stage 322 and the R-gear shift stage 323.

When the shift lever 200 receives the gear shift command corresponding to the P-gear shift stage 311, the cover 230 may move along the rail 223 so that the size of the cover 230 disposed on the first body 221 is larger than that of the cover 230 disposed on the second body 222.

The driver grasping the shift lever 200 can recognize a fact that the size of the cover 230 disposed on the first body 221 in contact with the palm is larger than that of the cover 230 disposed on the second body 222 in contact with the fingers with only the tactile sense.

Therefore, the driver can intuitively recognize a fact that the gear shift command of the P-gear shift stage 311 is input to the shift lever 200.

However, the present disclosure is not limited thereto. That is, when the shift lever 200 receives the gear shift command corresponding to the P-gear shift stage 311, the driver can recognize a fact that the gear shift command of the P-gear shift stage 311 is input to the shift lever 200 only with the tactile sense when the shift lever 200 is linearly moved backward along the accommodation space 141, regardless of the size of the cover 230 disposed on each of the first body 221 and the second body 222.

Accordingly, the driver can intuitively distinguish the gear shift command of the R-gear shift stage 323 and the gear shift command of the P-gear shift stage 311 through the tactile sense when the shift lever 200 is linearly moved backward along the accommodation space 141.

Figure 8:
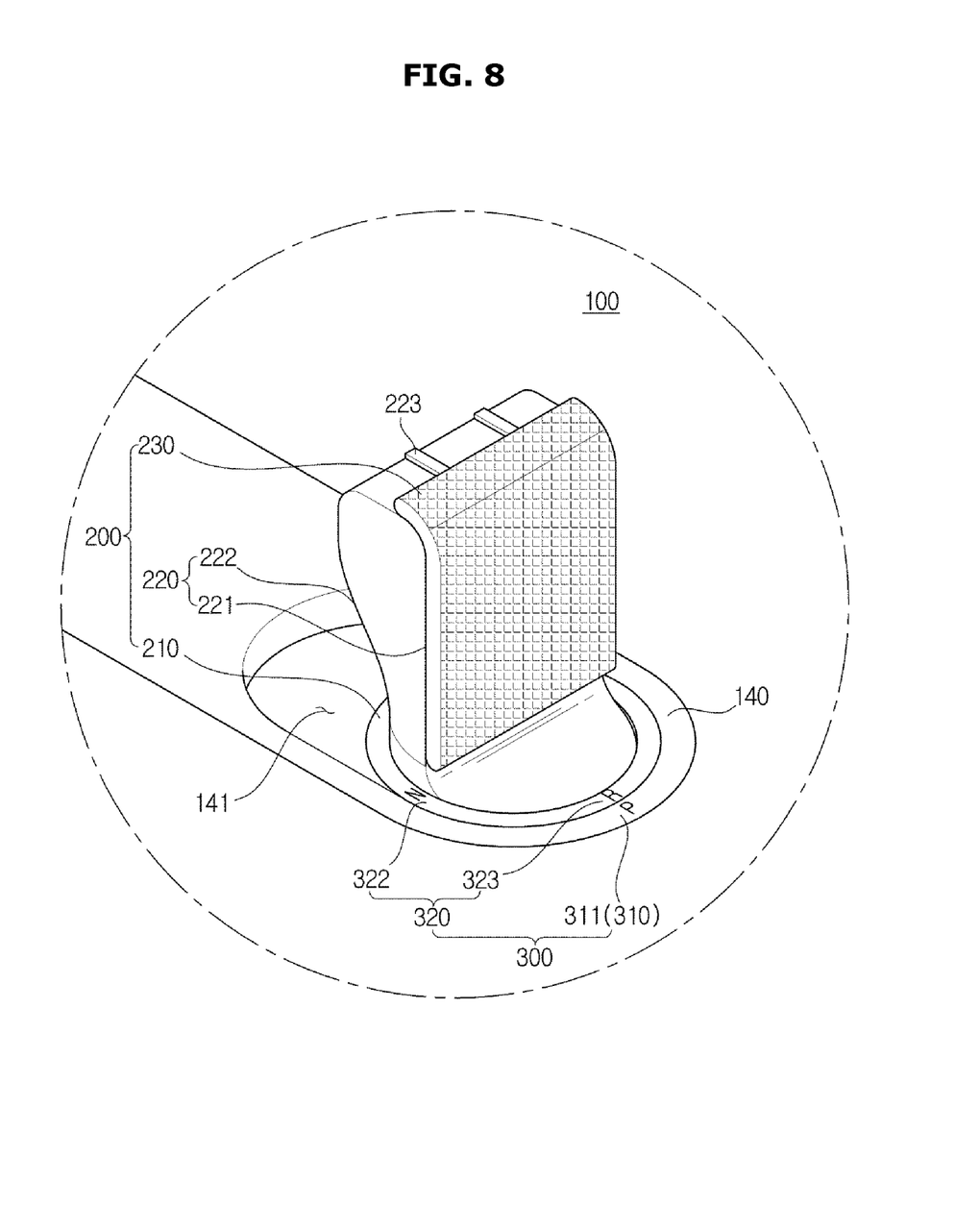
FIG. 8 is a view illustrating a state in which a gear shift command corresponding to a P-gear shift stage is input to a shift lever in a transmission apparatus for a vehicle according to an embodiment of the present disclosure.

FIG. 8 is a view illustrating a state in which the gear shift command corresponding to the P-gear shift stage is input to the shift lever in a transmission apparatus for a vehicle according to another embodiment of the present disclosure. As illustrated in FIG. 8, when the shift lever 200 receives the gear shift command corresponding to the P-gear shift stage 311, the cover 230 may move to be disposed only on the first body 221.

The driver grasping the shift lever 200 may recognize a fact that the cover 230 is not disposed on the second body 222 in contact with the fingers but is disposed only on the first body 221 in contact with the palm with only the tactile sense.

Therefore, the driver can intuitively recognize a fact that the gear shift command of the P-gear shift stage 311, instead of the R-gear shift stage 323, is input to the shift lever 200.

As is apparent from the above description, the present disclosure may include the shift levers having various shapes by including the first gear shift stage capable of shifting gears in accordance with the linear movement of the shift lever and the plurality of second gear shift stages capable of shifting gears in accordance with the rotation of the shift lever.

In the present disclosure, because the position of the cover moves to correspond to the gear shift stage when the shift lever receives the gear shift command, a driver's gaze is not distracted, and the shift of the gear shift stage can be detected only by the tactile sense when the driver grasps the shift lever.

Although the technical idea of the present disclosure has been described above with reference to the specific embodiments, the scope of the present disclosure is not limited to these embodiments.

It would be appreciated by those having ordinary skill in the art that changes may be made in these embodiments without departing from the principles and spirit of the disclosure, the scope of which is defined in the claims and their equivalents.

What is claimed is:

1. A transmission apparatus for a vehicle, which performs a gear shift according to a gear shift command received by a shift lever, the transmission apparatus comprising:
    a bottom portion configured to move in a linear direction so that gear shift stages including a first gear shift stage and a plurality of second gear shift stages are mutually shifted;
    a body rotatably coupled to an upper side of the bottom portion so that the plurality of second gear shift stages are mutually shifted; and
    a cover movably disposed on an upper end of the body, wherein the body includes a first body configured to face the linear direction to input the gear shift command to the shift lever and the body includes a second body configured to face in a direction opposite to the first body, and
    wherein the cover is disposed on the first body or on the second body so that a size of the cover disposed on the first body and a size of the cover disposed on the second body are configured to vary according to the mutual shift of the gear shift stages.

2. The transmission apparatus according to claim 1, wherein the body further comprises a rail provided so that the cover is movable coupled to the body.

3. The transmission apparatus according to claim 1, wherein the body comprises a rail provided so that the cover is movable coupled to the body.

4. The transmission apparatus according to claim 1, wherein the cover comprises an elastic material.

5. The transmission apparatus according to claim 1, further comprising:
    a potentiometer configured to measure a rotation angle of the body so that the shift lever receives the gear shift command according to rotation of the body.

6. The transmission apparatus according to claim 5, further comprising:
    a rotary encoder integrated motor having a rotary encoder configured to receive the gear shift command according to the rotation angle of the body measured by the potentiometer and a motor configured to move the cover in response to the gear shift command received by the rotary encoder.

7. The transmission apparatus according to claim 6, further comprising:
    an accommodation portion having an accommodation space in which the bottom portion is accommodated to linearly move forward and backward.

8. The transmission apparatus according to claim 7, further comprising:
    a tact switch provided to protrude from an inside of the accommodation portion into the accommodation space toward the shift lever to receive the gear shift command by interfering with the bottom portion.

9. The transmission apparatus according to claim 1, wherein the shift lever is configured to move forward and backward between the first gear shift stage and the plurality of second gear shift stages disposed in front of the first gear shift stage.

10. The transmission apparatus according to claim 1, wherein the plurality of second gear shift stages are configured to be mutually shifted by rotating by 90 degrees.

11. The transmission apparatus according to claim 1, further comprising:
    an accommodation portion having an accommodation space in which the bottom portion is accommodated to linearly move forward and backward.

12. The transmission apparatus according to claim 11, further comprising:
    a tact switch provided to protrude from an inside of the accommodation portion into the accommodation space toward the shift lever to receive the gear shift command by interfering with the bottom portion.

13. The transmission apparatus according to claim 1, wherein the first gear shift stage comprises a P-gear shift stage, and the plurality of second gear shift stages comprises a D-gear shift stage, a N-gear shift stage, and a R-gear shift stage.

14. The transmission apparatus according to claim 13, wherein, when the shift lever receives the gear shift command corresponding to the D-gear shift stage or the R-gear shift stage, the cover is disposed on the body so that a size of the cover disposed on the first body is larger than that of the cover disposed on the second body.

15. The transmission apparatus according to claim 13, wherein, when the shift lever receives the gear shift command corresponding to the N-gear shift stage, the cover is disposed on the body so that a size of the cover disposed on the first body and that of the cover disposed on the second body are a same size.

16. The transmission apparatus according to claim 13, wherein the D-gear shift stage and the R-gear shift stage are spaced apart from each other by 180 degrees, and the N-gear shift stage is spaced apart from the D-gear shift stage or the R-gear shift stage by 90 degrees.

17. The transmission apparatus according to claim 13, wherein, when the shift lever receives the gear shift command corresponding to the P-gear shift stage, the cover is disposed only on the first body.

18. A transmission apparatus for a vehicle, which performs a gear shift according to a gear shift command of a gear shift stage received by a shift lever configured to move in a linear direction, the transmission apparatus comprising:
- a body having a first body configured to face the linear direction to input the gear shift command to the shift lever and having a second body configured to face in a direction opposite to the first body; and
- a cover movably disposed on an upper end of the body, wherein the cover is configured such that a size of the cover disposed on the first body and a size of the cover disposed on the second body are varied according to the gear shift command of the gear shift stage.

* * * * *